Jan. 24, 1956     J. EHRET, JR., ET AL     2,731,772
TUBULATING MACHINE CHUCK

Filed March 30, 1953     2 Sheets-Sheet 1

INVENTORS
J. EHRET, JR.
E. A. HECKMAN
BY
ATTORNEY

Jan. 24, 1956     J. EHRET, JR., ET AL     2,731,772
TUBULATING MACHINE CHUCK
Filed March 30, 1953     2 Sheets-Sheet 2
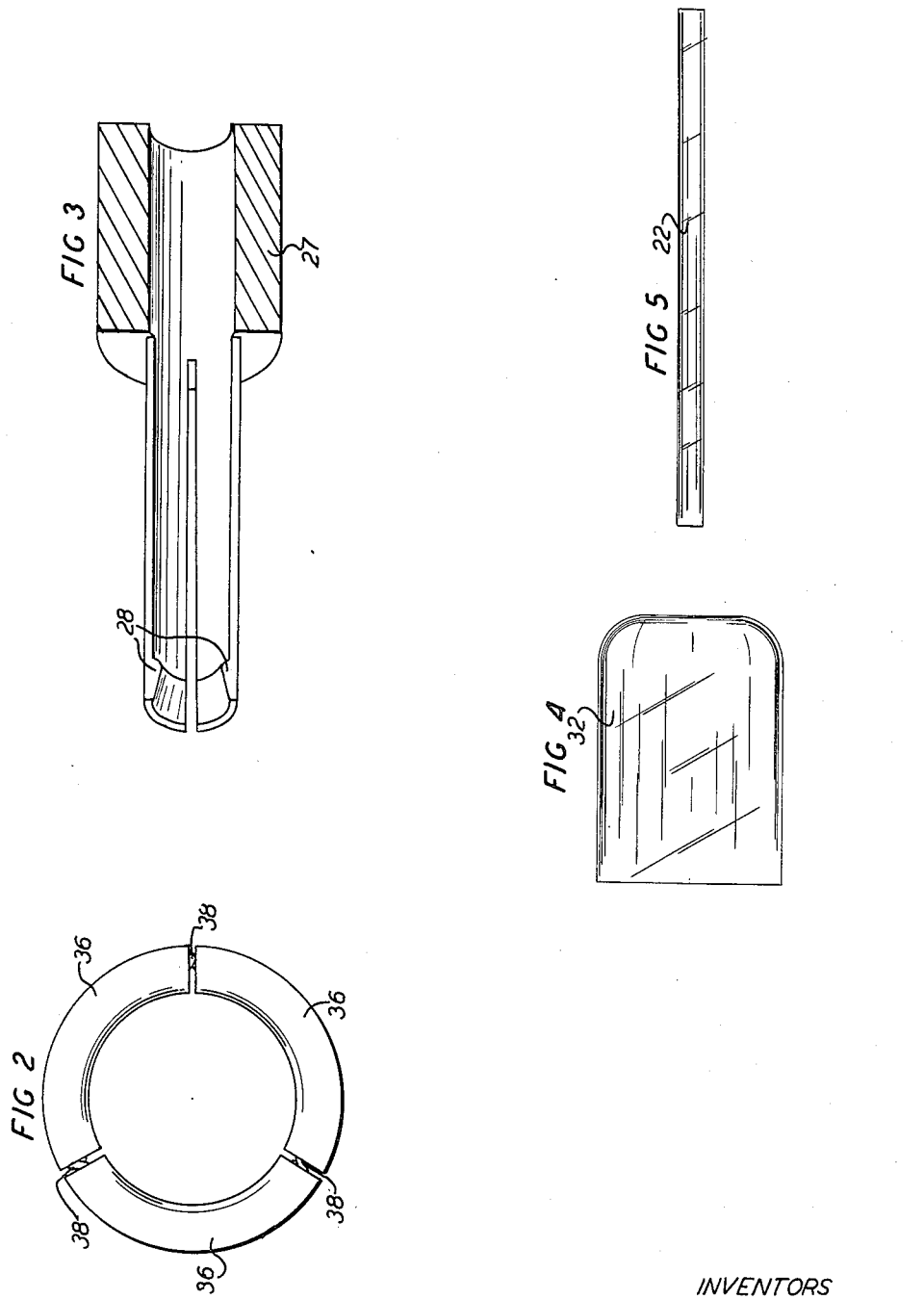
INVENTORS
J. EHRET, JR.
E. A. HECKMAN
BY
ATTORNEY

United States Patent Office 2,731,772
Patented Jan. 24, 1956

2,731,772

TUBULATING MACHINE CHUCK

John Ehret, Jr., and Edward A. Heckman, Allentown, Pa., assignors to Western Electric Company, Incorporated, New York, N. Y., a corporation of New York Application March 30, 1953, Serial No. 345,518

5 Claims. (Cl. 49—64)

This invention relates to tubulating machines and more particularly to bulb and tube supporting units thereof.

In the manufacture of miniature tubes it is necessary to tubulate the bulbs therefor, and in doing so, considerable difficulty has been experienced not only in positioning the bulbs and tubes with respect to each other but in holding them in proper alignment and in abutting engagement with each other while subjecting them to heat sufficient to fuse them together.

An object of the present invention is an apparatus capable of overcoming these difficulties.

With this and other objects in view, the invention comprises a particular structure, in a tubulating machine, including a support wherein one chuck is mounted and adapted to removably hold a bulb with its center line in a given position while another chuck mounted in the support is adapted to removably hold a tube in abutting engagement with the bulb with the center line of the tube in alignment with the center line of the bulb.

In the present embodiment of the invention, the support is one of many, rotatably mounted at equally spaced positions about a vertically positioned turret, which moves intermittently from one station to another. During the intervals of rest, a bulb is fed to its respective chuck and accurately located therein by the aid of an annular locating member and companion radially positioned stops, associated with arcuate gripping elements which serve to hold the bulb in a given position. The other chuck is open at both ends to receive the tube from one end thereof for movement of its leading end into engagement with the bulb, this chuck having spaced gripping means to assure its alignment with the bulb permitting removal of the tube from the other end of the chuck.

Other objects and advantages will be apparent from the following detailed description when considered in conjunction with the accompanying drawings, wherein:

Fig. 2 is a front elevational view of the arcuate holding elements of the bulb support chuck;

Fig. 3 is an isometric longitudinal sectional view of one of the gripping means of the chuck for the tube;

Fig. 4 is a side elevational view of the bulb, and

Fig. 5 is a side elevational view of the tube.

Figure 1:
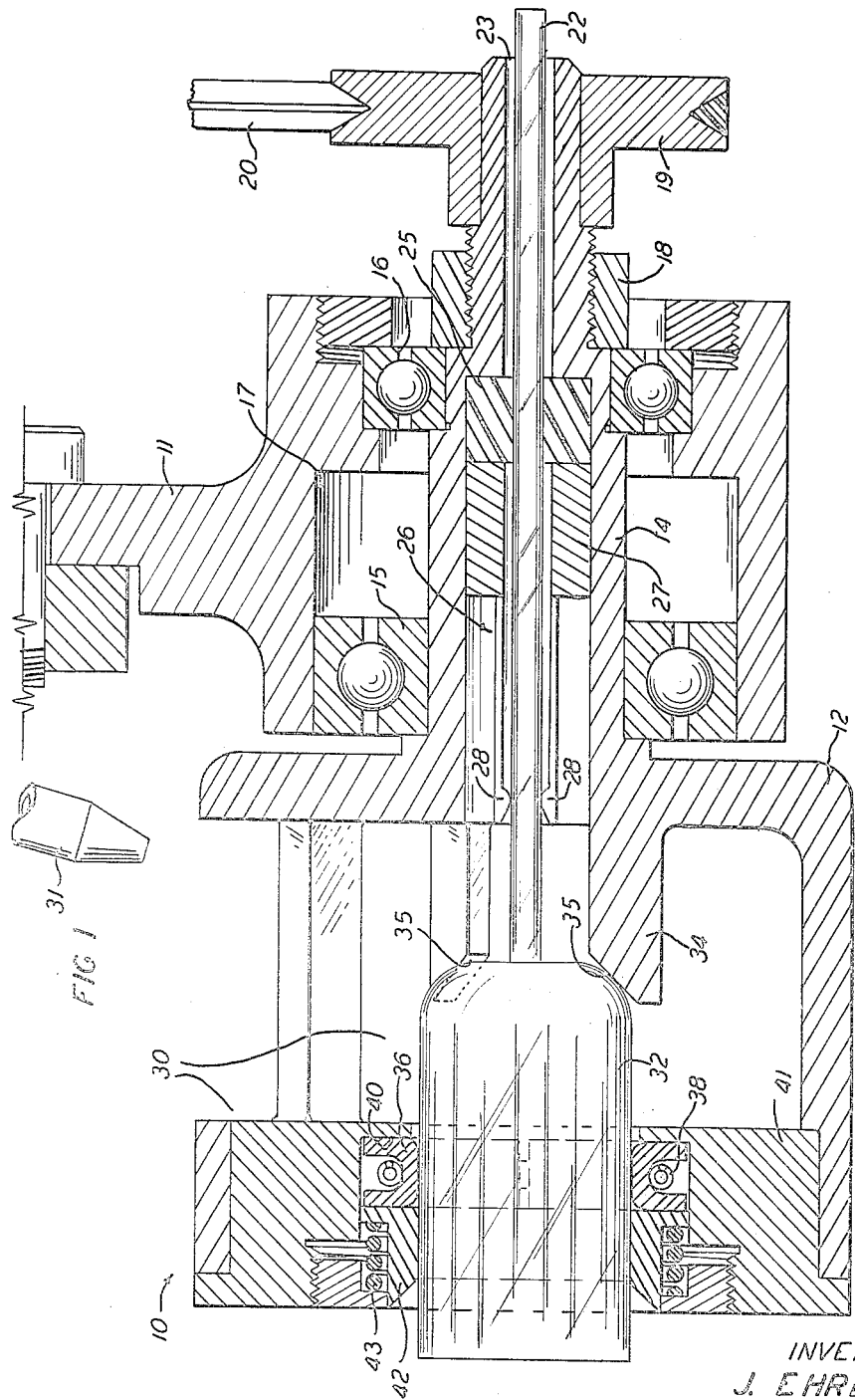
Fig. 1 is a fragmentary sectional view of a tubulating machine embodying the invention.

Referring now to the drawings, attention is first directed to Fig. 1 which illustrates a unit 10 rotatably mounted in a turret 11, which in the present embodiment of the invention is supported for movement intermittently about a horizontal axis. The unit 10 has a support 12 provided with a hollow spindle portion 14 supported by bearings 15 and 16 in a hollow portion 17, of the turret 11. The spindle 14 is held against axial movement by a threaded element 18 and has a pulley 19 mounted on its outer end, the pulley being operatively connected to a suitable driving means including a belt 20.

The spindle 14 is hollow to receive tubes 22 fed singly into the entrance end 23 thereof by suitable means not shown. Gripping means 25 and 26 are disposed in the hollow portion of the spindle 14, the gripping means 25 being an annular member of suitable material such as silicone rubber and having a central aperture suitably smaller in diameter than the diameter of the tube to hold the tube against displacement, once it has been located in the gripping means. The gripping means 26 includes a main member 27 having resilient gripping jaws 28 integral therewith to cooperate with the gripping means 25 in forming a chuck for the tube 22.

The support 12 has large apertures 30 therein, whereby flames from a desired number of nozzles 31 may be directed to the juncture of the tube 22 and a bulb 32. The bulb 32 is receivable in a chuck which is composed of three main groups of parts, one being equally spaced stops or projections 34 having tapered surfaces 35 to be engaged by the closed end of the bulb 32. Another group of parts of the chuck includes arcuate gripping elements 36 shown in Figs. 1 and 2, these elements being substantially U-shaped in cross-section to receive a garter-type spring 38 tending to force the three elements into engagement with the bulb 32 under like forces. The elements 36, held together by their spring 38, are disposed adjacent a shoulder 40 in an aperture of an end member 41. The elements 36 are urged against the shoulder 40 by the third group of elements which includes an annular locating element 42 and its spring 43. The inner diameter of the locating element 42 is very close to that of the bulb 32 so that it may function in locating the bulb with its center line coincident with the axis of the spindle 14 and in alignment with the center line of the tube 22 yet will not interfere with the loading of bulbs in the chuck or the removal of tubulated bulbs therefrom.

Considering now the operation of the tubulating machine and the function of this particular part of the machine, let it be assumed that during one of the intervals of rest, a bulb 32 is fed into the chuck therefor until it comes to rest in engagement with the surfaces 35 of the stops or locating portions 34. In loading the bulbs in the chuck therefore, the gripping elements 36, which have been closed or moved into engagement with each other, are forced apart sufficiently to permit movement of the bulb into the chuck and then grip the bulb to hold it against displacement. Furthermore, the locating element 42 has its entrance end bevelled to assist in directing the bulb to its proper position in the chuck.

At the next station the tube 22, which has been cut to a given length, is fed through the entrance end 23 of the spindle 14 into the chuck consisting of the gripping elements 25 and 26 until its leading end abuts the closed end of the bulb 32. When this has been accomplished, the various elements of the chucks for both the tube and the bulb assure alignment of their center lines and the positioning of these center lines coincident with the axis of the unit 10 namely the support or its spindle 14. With the assurance that the chucks for the tube and bulb have their centers in alignment with each other and are mounted in a single rotatable support with their center lines coincident with the axis of the support, it is possible, after feeding the tube and bulb to their chucks, to rotate the support about its axis, and therefore about the center lines of the tube and bulb, relative to properly positioned nozzles directing flames toward the juncture of the tube and bulb to bring about fusing of these parts together. At another position in the operation of the tubulating machine while the materials of the bulb and tube are in a fused state, a jet of air may be applied to this area of the bulb to puncture it thereby forming a connecting passage between the bulb and the tube. Also, at a later station, an element, not shown, may be actuated to engage the outer end of the tube and eject the tubulated bulb from the unit.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a tubulating machine, a hollow support having a centerline, a stop mounted within the support, an annular locating member carried by the support to receive a bulb and locate it adjacent the stop with its centerline coincident with the centerline of the hollow support, means to grip the bulb and hold it in said position, and a chuck for a tube mounted within the support and adapted to removably hold the tube in abutting engagement with the bulb with its centerline in alignment with the centerline of the bulb and coincident with the centerline of the hollow support.

2. In a tubulating machine, a support having a spindle portion mounted for rotation about its axis with an aperture coincident with the axis extending longitudinally therethrough and opening into an enlarged hollow portion integral with the spindle portion and having an opening in the side thereof and an aperture therein coincident with said axis, a chuck mounted within the aperture of the enlarged portion and adapted to removably hold a bulb with its centerline coincident with said axis, and a chuck for a tube mounted in the aperture of the spindle portion and adapted to removably hold the tube in abutting engagement with the bulb with the centerline of the tube coincident with the axis of the support and in alignment with the centerline of the bulb.

3. In a tubulating machine, a support having a spindle portion mounted for rotation about its axis with an aperture coincident with the axis extending longitudinally therethrough and opening into an enlarged hollow portion integral with the spindle portion and having an opening in the side thereof and an aperture therein coincident with said axis, and individual chucks for a tube and a bulb mounted respectively in the apertures of the spindle portion and the enlarged portion of the rotatable hollow support with their centerlines in alignment with each other, coincident with the axis of the support and open at both ends, whereby the tube and bulb may be fed into and through their chucks from their outer ends to be fused in abutting engagement with each other and removed outwardly through the chuck for the bulb.

4. In a tubulating machine, a support having a spindle portion mounted for rotation about its axis with an aperture coincident with the axis extending longitudinally therethrough and opening into an enlarged hollow portion integral with the spindle portion and having an opening in the side thereof and an aperture therein coincident with said axis, a chuck mounted within the aperture of the enlarged portion and adapted to removably hold a bulb with its centerline coincident with said axis, a stop mounted in the enlarged portion of the support to be engaged by the bulb to locate the closed end of the bulb at a predetermined position relative to the chuck, and a chuck for a tube mounted in the aperture of the spindle portion and adapted to removably hold the tube in abutting engagement with the bulb with the centerline of the tube coincident with the axis of the support and in alignment with the centerline of the bulb.

5. In a tubulating machine, a support having a spindle portion mounted for rotation about its axis with an aperture coincident with the axis extending longitudinally therethrough and opening into an enlarged hollow portion integral with the spindle portion and having an opening in the side thereof and an aperture therein coincident with said axis, a chuck mounted within the aperture of the enlarged portion and adapted to removably hold a bulb with its centerline coincident with said axis, a stop mounted in the enlarged portion of the support to be engaged by the bulb to locate the closed end of the bulb at a predetermined position relative to the chuck, a chuck for a tube mounted in the aperture of the spindle portion and adapted to removably hold the tube in abutting engagement with the bulb with the centerline of the tube coincident with the axis of the support and in alignment with the centerline of the bulb, said opening in the side of the enlarged portion permitting the application of heat to the juncture of the bulb and tube between the chucks in the support to fuse the bulb and tube.

References Cited in the file of this patent

UNITED STATES PATENTS

| | | |
|---|---|---|
| 918,669 | Graybill | Apr. 20, 1909 |
| 1,891,436 | Mitchell | Dec. 20, 1932 |
| 2,023,628 | Van Sant | Dec. 10, 1935 |
| 2,343,570 | Nelson | Mar. 7, 1944 |
| 2,376,540 | Iden | May 22, 1945 |
| 2,447,569 | Eisler | Aug. 24, 1948 |
| 2,549,762 | Baker et al. | Apr. 24, 1951 |